US006308960B1

(12) United States Patent
Peale

(10) Patent No.: US 6,308,960 B1
(45) Date of Patent: Oct. 30, 2001

(54) V-LOCK SEGMENTED SPEAKER GASKET

(75) Inventor: Seymour Peale, Northbrook, IL (US)

(73) Assignee: United Gasket Corporation, Cicero, IL (US)

( * ) Notice: Subject to any disclaimer, the term of this patent is extended or adjusted under 35 U.S.C. 154(b) by 0 days.

(21) Appl. No.: 09/281,156

(22) Filed: Mar. 30, 1999

(51) Int. Cl.[7] .................................................. F16J 15/02
(52) U.S. Cl. ......................... 277/631; 277/632; 277/644; 277/650; 181/199
(58) Field of Search ................................ 277/631, 632, 277/650, 654, 935, 936, 546, 547; 24/578, 700; 181/150, 151, 171, 172, 199

(56) References Cited

U.S. PATENT DOCUMENTS

| | | | | |
|---|---|---|---|---|
| 1,986,465 | * | 1/1935 | Dempsey | 277/632 |
| 3,124,502 | * | 3/1964 | Radke | 277/536 |
| 3,245,693 | * | 4/1966 | Way | 277/631 |
| 3,580,765 | * | 5/1971 | Grove | 277/631 |
| 3,738,670 | * | 6/1973 | Jelinek et al. | 277/632 |
| 4,017,090 | * | 4/1977 | Cohen | 277/644 |
| 4,875,259 | * | 10/1989 | Appeldorn | 24/576 |
| 5,115,884 | * | 5/1992 | Falco | 181/156 |
| 5,149,109 | * | 9/1992 | Jelinek et al. | 277/632 |
| 5,533,306 | * | 7/1996 | Aspenson | 52/144 |
| 5,615,897 | * | 4/1997 | Akita | 277/654 |
| 5,739,481 | * | 4/1998 | Baumhauer, Jr. et al. | 181/148 |
| 6,076,832 | * | 6/2000 | Pow | 277/546 |

* cited by examiner

*Primary Examiner*—Anthony Knight
*Assistant Examiner*—Alison K. Pickard
(74) *Attorney, Agent, or Firm*—Michael Best & Friedrich LLC

(57) ABSTRACT

A gasket especially adapted for use as a speaker ring is provided. The gasket is formed of a plurality of segments, each having first and second ends defining first and second complementary mating surfaces respectively. The complimentary mating surfaces allow the segments to be placed end to end with the first mating surface of a segment abutting the second mating surface of an adjacent segment. All of the segments arranged together in this manner form closed gasketed ring. The first mating surface of each segment is made up of first and second relatively flat shoulders adjacent the inner and outer sides of each segment respectively, and a triangular projection extending between the first and second shoulders. Similarly, the second mating surface of each segment is made up of third and fourth relatively flat shoulders adjacent the inner and outer sides of each segment, and a triangular recess or notch extending between the third and fourth shoulders. The triangular recess of the second mating surface is substantially the inverse of the triangular projection protruding from the first mating surface.

22 Claims, 3 Drawing Sheets

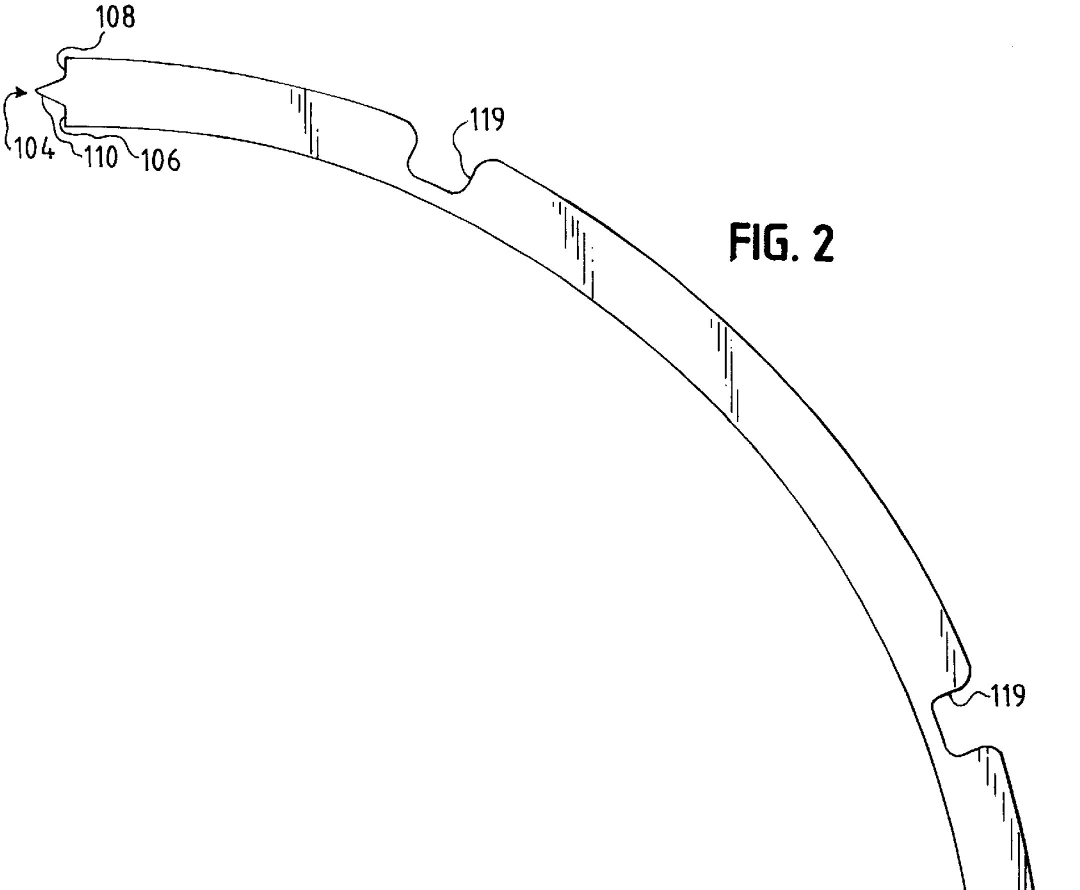
FIG. 2
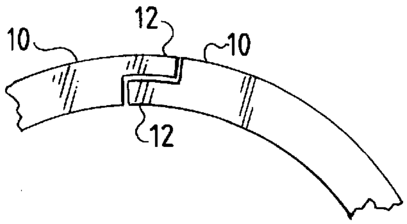
FIG. 1A
PRIOR ART
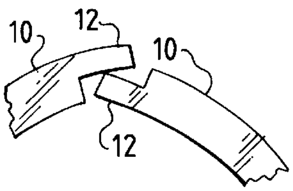
FIG. 1B
PRIOR ART
FIG. 1C
PRIOR ART
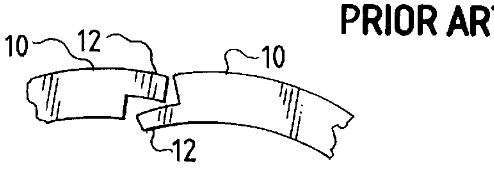

V-LOCK SEGMENTED SPEAKER GASKET

BACKGROUND OF THE INVENTION

The present invention relates to audio speakers, and more particularly to an improved gasket or speaker ring employed in mounting a speaker assembly to a speaker cabinet.

Audio speakers include, among other things, a vibrating paper cone which generates sound waves in response to electrical signals supplied to the speaker. In order to operate effectively the speaker must be mounted in a way that allows the paper cone to vibrate freely so that sounds may be faithfully reproduced without distortion.

Typically, a speaker will be mounted within a conical support basket. The speaker basket includes a base at the smaller end of the basket for supporting the electrical components of the speaker. Opposite the base, the front or top of the basket forms a circular rim comprising an annular flange extending parallel to the front face of the speaker and extending around the perimeter thereof, and a small lip which extends forward from the flange again, encircling the entire perimeter of the basket. When the speaker is mounted in the basket, the vibrating speaker cone extends from near the base toward the rim of the basket where it is attached to the annular flange.

For attaching the vibrating cone to the flange, a structure known as a roll-over is attached to the outer peripheral edge of the cone. The roll-over may be formed of plastic or some other suitable material, and comprises a transition piece from the conical sidewalls of the vibrating cone to the flat annular surface of the speaker basket rim. In general, the roll-over comprises a first conical surface which is glued or otherwise attached to the vibrating speaker cone, and a second flat annular surface for attaching to the rim of the speaker basket. An arcuate ridge, or a succession of such ridges arranged side-by-side in a corrugated fashion, form the transition from the flat annular surface of the roll-over to the inner conical surface of the rollover, and thus to the speaker cone itself. When the conical surface of the roll-over is joined to the speaker cone and the flat annular surface is glued to the annular rim of the speaker basket, the arcuate ridge or ridges forming the transition section allow the conical surface of the roll-over, as well as the speaker cone itself, to move back and forth axially relative to the rim of the speaker basket. Thus, the roll-over allows the speaker cone to vibrate freely without distortion.

Once the roll-over has been attached to the annular flange, a speaker ring or gasket is inserted around the rim of the basket above the rollover. The speaker ring is typically glued to the flat portion of the roll-over. Prior to gluing, the speaker ring is held in place in the outward radial direction by the short lip extending around the outer edge of the speaker basket rim.

When finally assembled, the speaker basket, speaker, and speaker ring may be mounted to a speaker cabinet. This may be accomplished in one of two ways. First, the outer surface of the speaker ring can be placed flat against a mounting panel of the speaker cabinet, and fasteners such as screws may be inserted through the mounting panel and the speaker basket flange to attach the speaker to the mounting panel. In this arrangement the speaker ring acts to isolate the vibrating cone within the speaker from the mounting panel of the speaker cabinet, thereby limiting distortion to the audio signals broadcast by the speaker. Alternately, the speaker assembly may be dropped into a hole formed in the mounting panel of the speaker cabinet. In this arrangement, the back side of the speaker basket annular flange engages the mounting panel and fasteners may be inserted through the annular flange and the mounting panel to secure the speaker assembly within the cabinet. In this arrangement, the mounting flange and roll-over are visible from the front of the cabinet. Therefore, the speaker ring performs a more aesthetic function by providing a neat trim piece which conceals the annular flange and the glued-in-place roll-over.

Speaker rings are typically supplied in short arcuate segments. During the speaker assembly process the individual segments must be manually placed within the basket rim and glued to the upper surface of the roll-over. From a production standpoint, inserting the segments and aligning them properly around the rim is a time consuming and costly process. Further, once the segments are glued, making sure they remain in place until the glue has set has also been a long standing manufacturing challenge.

Past speaker rings have been formed with lap joint type mating surfaces as shown in FIG. 1. In this arrangement, segments 10 are formed having "L" shaped projections 12 extending from each end of the segment such that when adjacent segments are placed end to end the projections 12 overlap one another. While the lap joint arrangement provides some benefit in helping to properly locate ring segments adjacent one another, it still allows some margin for error in aligning the various segments as shown in FIGS. 1*b* and 1*c*. As is clear from these drawings, the lap joint arrangement does not prevent the speaker ring segments from collapsing radially inward toward the center of the speaker. Thus, prior to the glue setting, the segments are somewhat unstable and likely to move. If the glue sets while speaker ring segments are misaligned, the entire assembly must be scrapped.

Therefore, a self aligning segmented speaker ring is desired wherein adjacent abutting segments are automatically centered relative to one another by action of their respective mating surfaces. It is further desired that the mating surfaces provide additional support for maintaining the proper shape of the ring during the period of the assembly process when the glue applied to the speaker ring segments is setting.

SUMMARY OF THE INVENTION

In light of the background given above, an object of the present invention is to provide an improved segmented gasket that may be effectively employed as a self centering speaker ring.

Another object of the invention is to provide an improved speaker assembly having a self aligning speaker ring.

Yet another object of the invention is to provide a segmented speaker ring which tends to retain its proper shape during the speaker assembly and shipping process.

All of these objects as well as others which will become apparent upon reading the detailed description of the preferred embodiments, are met by the V-lock segmented gasket and speaker assembly herein disclosed.

The present invention provides a gasket or speaker ring made up of a plurality of individual segments. Each segment is formed with complementary mating surfaces at each end such that, when the segments are arranged end to end to form a closed ring, a first mating surface of a first segment abuts the second mating surface of a second segment, and so on around the entire gasket.

The first mating surface comprises a pair of flat shoulders adjacent the inner and outer sides of the gasket segment, and a triangular or V-shaped projection extending forward between the two shoulders. The second mating surface also comprises a pair of flat shoulders, each adjacent the inner and outer surfaces of the gasket segment, and a triangular or V-shaped groove or notch disposed between the shoulders. The V-shaped notch in the second mating surface is the complement of the V-shaped protrusion of the first mating surface. When two gasket segments are placed end to end with the first mating surface of one segment abutting the second mating surface of another, the V-shaped protrusion of the first segment fits securely within the V-shaped notch of the second mating surface, and the shoulders of the first mating surface abut the shoulders of the second mating surface. The V-shaped protrusion and complementary notch assure that the two segments align properly, and the abutting shoulders ensure that the segments maintain the proper angular relationship with respect to one another. The present invention further comprehends a speaker assembly including a multi-segment speaker ring as just described.

BRIEF DESCRIPTION OF THE DRAWINGS

FIG. 1 is partial view of a prior art segmented gasket having lap-joint mating surfaces, FIG. 1*a* shows the segments properly aligned, and FIGS. 1*b* and 1*c* show the segments in various misaligned positions;

FIG. 2 is a plan view of a single segment of a multi-segment gasket according to the preferred embodiment of the invention;

DETAILED DESCRIPTION OF THE PREFERRED EMBODIMENTS

Figure 3:
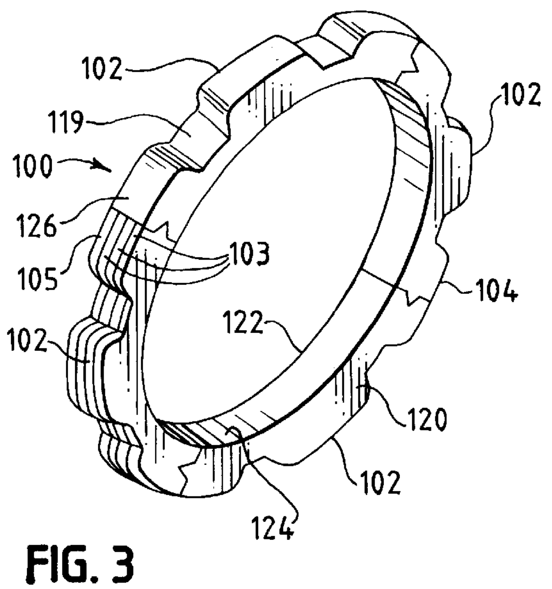
FIG. 3 is a perspective view of an assembled multi-segment gasket according to the preferred embodiment of the invention.

Referring to FIGS. 2 and 3, an annular multi-segment gasket specially adapted for use as a speaker ring is shown at 100. In the preferred embodiment, gasket 100 is formed of a material specially selected for acoustic applications. Materials particularly well suited for forming speaker ring gaskets include cork, rubber, plastic, plastic foam, medium density fiberboard, chipboard, and other similar materials. In addition to solid materials, gasket 100 may further comprise laminates comprising the aforementioned materials, as well as various combinations thereof. For example, in a preferred embodiment the gasket segments comprise a plurality of chipboard laminates 103 and a single cork laminate 105.

The entire gasket 100 comprises a plurality of individual segments 102. In the preferred embodiment, gasket 100 is provided in the form of a circular ring with each segment forming an arcuate portion of a circle. However, other shapes such as square, rectangular, elliptical or others are possible. Further, gasket 100 is shown comprising four equal segments 102, however, the number of segments may be changed to meet the requirements of a particular application.

Each segment 102 comprises an inner surface 124 and an outer surface 126. First end 104 and second end 112 define the mating surfaces that engage the next adjacent segment when the entire gasket is assembled. The first end 104 comprises a male mating surface characterized by a pair of flat shoulders 106, 108 which extend between inner and outer surfaces 124, 126. A triangular or V-shaped protrusion 110 extends forward between shoulders 106, 108.

The second end 112 of each gasket segment 102 comprises a female mating surface which is the complement of the male mating surface formed at the first end 104. The female mating surface is characterized by a second pair of flat shoulders 114, 116 which extend between the inner and outer surfaces 124, 126. A triangular groove or notch 118 is formed in the second end between shoulders 114, 116.

The segments 102 are further defined by top and bottom surfaces 120, 122 as well as inner and outer surfaces 124, 126. The outer surface may be formed with inwardly directed notches 119. As will be described in more detail below, notches 119 allow fasteners to be inserted into structures below or behind speaker ring 100 when a speaker is being assembled.

Figure 7:
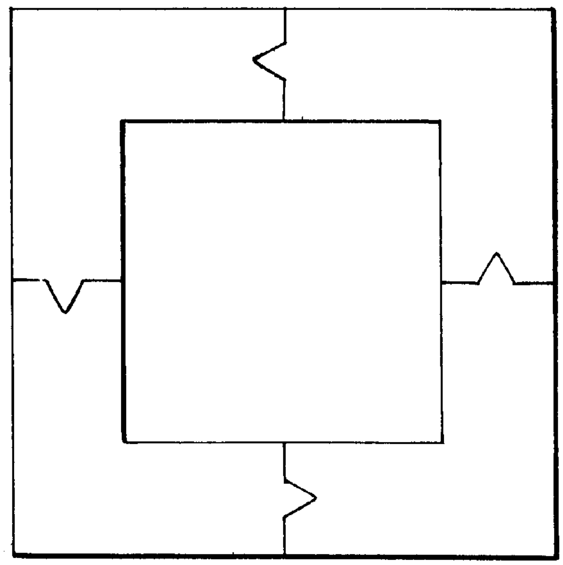
FIG. 7 is a plan view of a square segmented gasket according to the present invention.
Figure 8:
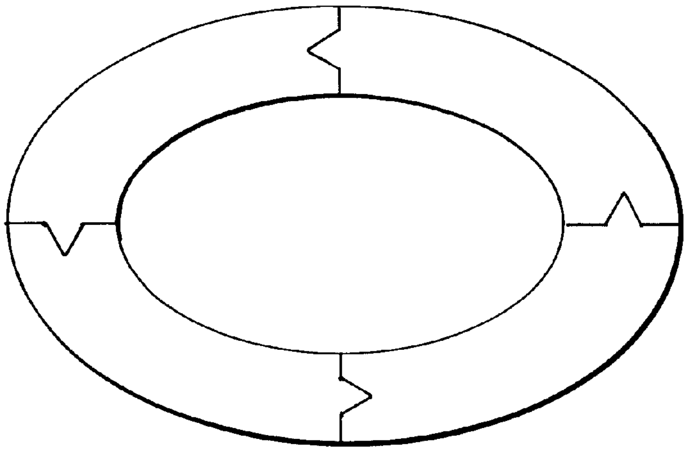
FIG. 8 is a plan view of an elliptical segmented gasket according to the present invention.

In the preferred embodiment, each segment 102 forms a 90° arc. Thus, when four segments are placed end to end a full circular gasket is formed as shown in FIG. 3. While a circular gasket is preferred, other shapes may also be employed. For example FIG. 7 shows a square segmented gasket wherein each segment forms a right angle between two perpendicular arms. FIG. 8 shows an elliptical gasket wherein each segment forms a portion of an ellipse. It should be clear that by properly forming the individual segments, almost any shape gasket may be realized. The individual segments 102 are placed end to end such that the first end of a segment abuts the second end of the next adjacent segment around the entire circumference of the gasket. In this arrangement the female mating surface of each segment receives the male mating surface of an adjacent segment, and the shoulders 114, 116 of the female mating surfaces lie flat against the shoulders 104, 106 of the abutting male mating surface. The angled sides of the V-shaped protrusion 110 engage the angled sides of the notch 118 to force the two adjacent segments into a centered and aligned position. Also, the abutting shoulders 104, 114 and 106, 116 provide rigidity and strength to the gasket, helping to hold the various segments in place.

Figure 5:
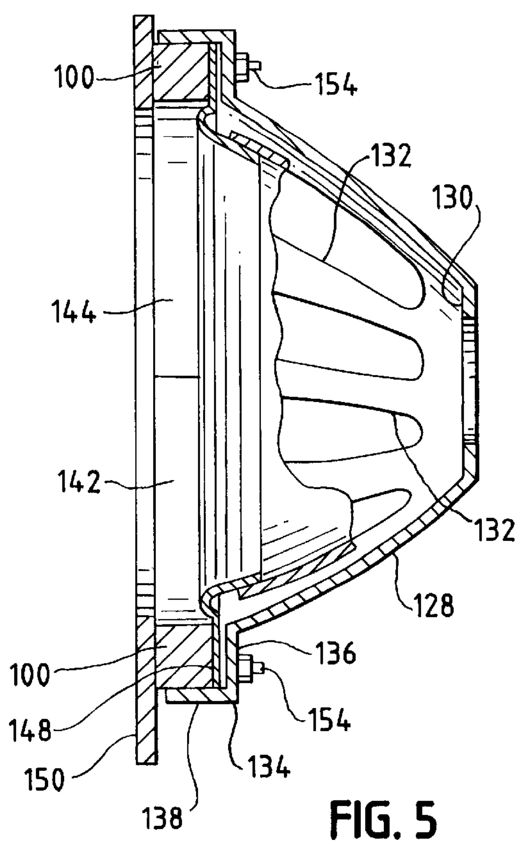
FIG. 5 is a cross section of the speaker assembly of FIG. 4 taken along the line 5—5.
Figure 4:
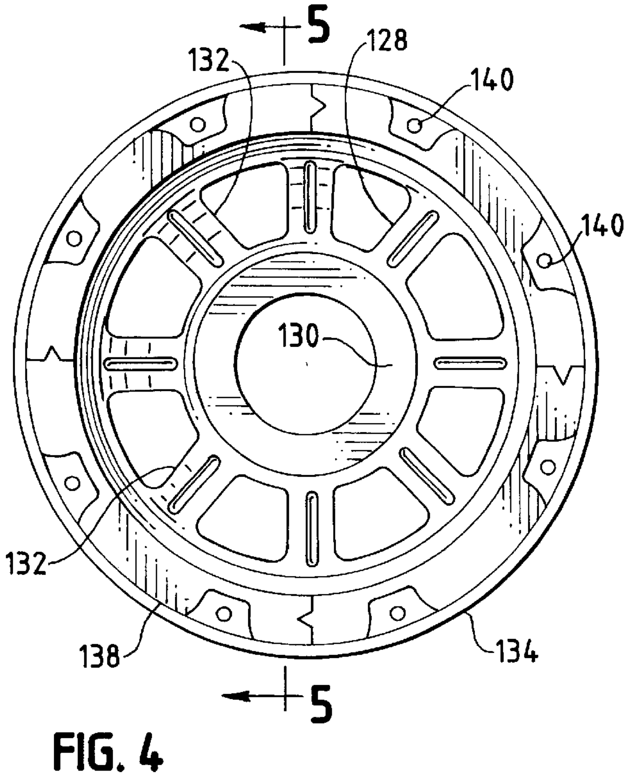
FIG. 4 is a front view of a speaker assembly including a multi-segment speaker ring according to the preferred embodiment of the invention.
Figure 6:
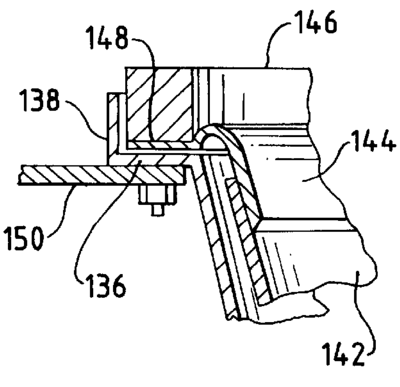
FIG. 6 is an enlarged partial view of the cross section of FIG. 5 showing the outer rim of the speaker assembly.

Turning to FIGS. 4, 5, and 6, a speaker assembly is shown employing a speaker ring 100 according to the present invention. The speaker assembly includes a metal basket 128 for supporting the speaker. Basket 128 is generally conical in shape, having a base 130 located at the smaller end of the basket. The electrical components that make up the speaker (not shown) may be mounted to base 130. A plurality of side support members 132 extend in an outward manner from the base to an annular rim 134 located above the base. Rim 134 includes a flange 136 that extends parallel to the base 130, and a short lip 138 that extends perpendicular to the flange. Flange 136 may be formed having a plurality of mounting holes for receiving fasteners such as screws for mounting the speaker assembly to a speaker cabinet.

The speaker itself includes a vibrating paper cone 142 that generates sound waves in response to electrical signals received by the speaker. For the speaker to function properly, the vibrating cone 142 must be simultaneously supported by rim 134 yet allowed to vibrate freely to produce undistorted sound. For this purpose a structure known as a roll-over 144 is attached to the distal end of the vibrating cone 142. The roll-over includes a first conical surface 146 which is glued or otherwise attached to the vibrating cone, and a flat annular surface 148 configured to engage the annular flange 136 comprising the speaker basket rim 134. The flat annular surface 148 of the roll-over is glued to the flange 136 to secure the vibrating cone 142 to rim 134.

Next the speaker ring or gasket 100 is inserted within rim 134 above the roll-over. The outer surface 126 of the gasket engages the inner surface of lip 138, and the bottom surface 122 of the gasket is glued to the roll-over. The upper surface 120 of the gasket extends above the height of lip 138. The recessed portions 119 of the gasket segments 102 are aligned with the holes 140 formed in the flange 136 of rim 134 so that fasteners 154 may be inserted through the holes after gasket 100 has been glued in place. As has been discussed, the nature of the complimentary mating surfaces on each end of the gasket segments help to align the gasket 100 within rim 134 and ensure that the gasket remains in place while it is glued to the roll-over 144. The self aligning and self centering aspect of the mating surfaces reduce the amount of time necessary to properly assemble the gasket 100 within rim 134.

FIG. 5 shows the speaker assembly front mounted to the face 150 of a speaker cabinet. As can be seen, the gasket 100 extends beyond the annular lip 138 that surrounds the rim. Thus, only the gasket actually engages the face 150 of the speaker cabinet, thereby isolating the speaker from the surfaces of the cabinet.

FIG. 6 shows a somewhat different speaker mounting arrangement wherein the speaker assembly is dropped into a hole formed in the face 150 of a speaker cabinet. In this arrangement the speaker face 150 engages the back side of flange 136 and the gasket 100 is visible from the front of the speaker. Thus, the gasket acts as trim providing a more finished appearance to the overall speaker assembly.

It should be noted that various changes and modifications to the present invention might be made by those of ordinary skill in the art without departing from the spirit and scope of the present invention which is set out in more particular detail in the appended claims. Furthermore, those of ordinary skill in the art will appreciate that the foregoing description is by way of example only, and is not intended to be limiting of the invention as described in such appended claims.

What is claimed is:

1. An assembly mounting an audio speaker to a cabinet wherein the speaker includes a vibrating cone having a rollover mounting structure attached thereto, the assembly comprising:

a generally conical speaker basket having a circular rim defined by a flange extending around the perimeter of the basket and a lip extending perpendicularly form the flange;

said speaker mounted within said basket with said roll-over structure affixed to said flange; and a multi-segmented speaker ring disposed within the rim, the speaker ring having a base surface engaging and adhered to the roll-over structure, and an outer surface engaging the lip;

each segment of said speaker ring further comprising first and second complementary mating surfaces, the first mating surface comprising first and second shoulders flanking a projection extending therefrom, and the second mating surface comprising third and fourth shoulders flanking a triangular recess substantially the inverse of said projection, wherein the projection has a base at least as wide as the distal end thereof.

2. The assembly of claim 1 wherein said projection is triangular in shape.

3. The assembly of claim 2 wherein said speaker ring is formed of medium density fiberboard.

4. The assembly of claim 2 wherein said speaker ring is formed of rubber.

5. The assembly of claim 2 wherein said speaker ring is formed of cork.

6. The assembly of claim 2 wherein said speaker ring is formed of plastic.

7. The assembly of claim 2 wherein said speaker ring is formed of a plurality of medium density fiberboard laminates.

8. The assembly of claim 2 wherein said speaker ring is formed of a combination of medium density fiberboard and cork laminates.

9. The assembly of claim 2 wherein said speaker ring is formed of chipboard.

10. The assembly of claim 2 wherein said speaker ring comprises four equal length arcuate segments.

11. The assembly of claim 2 wherein said triangular projections extending from the first mating surface of said plurality of segments comprises a first angled surface extending approximately 60° from said first shoulder, and a second angled surface extending approximately 60° from said second shoulder.

12. In an assembly for mounting an audio speaker to a cabinet wherein the assembly includes a speaker having a vibrating cone with a rollover mounting structure attached thereto and the speakers being mounted within a generally conical speaker basket having a circular rim defined by a flange extending around the perimeter of the basket and a lip extending perpendicularly from the flange and wherein the rollover mounting structure is affixed to the flange; the improvement comprising:

a multi-segmented speaker ring disposed within the rim, the speaker ring having a base surface engaging and adhered to the rollover structure, and an outer surface engaging the lip;

each segment of said speaker ring further comprising first and second complementary mating surfaces, the first mating surface comprising first and second shoulders flanking a projection extending therefrom, and the second mating surface comprising third and fourth shoulders flanking a triangular recess substantially the inverse of said projection, wherein the projection has a base at least as wide as the distal end thereof.

13. The assembly of claim 12 wherein said projection is triangular in shape.

14. The assembly of claim 13 wherein said speaker ring is formed of medium density fiberboard.

15. The assembly of claim 13 wherein said speaker ring is formed of rubber.

16. The assembly of claim 13 wherein said speaker ring is formed of cork.

17. The assembly of claim 13 wherein said speaker ring is formed of plastic.

18. The assembly of claim 13 wherein said speaker ring is formed of a plurality of medium density fiberboard laminates.

19. The assembly of claim 13 wherein said speaker ring is formed of a combination of medium density fiberboard and cork laminates.

20. The assembly of claim 13 wherein said speaker ring is formed of chipboard.

21. The assembly of claim 13 wherein said speaker ring comprises four equal length arcuate segments.

22. The assembly of claim 13 wherein said triangular projections extending from the first mating surface of said plurality of segments comprises a first angled surface extending approximately 60° from said first shoulder, and a second angled surface extending approximately 60° from said second shoulder.

* * * * *